United States Patent [19]
Lyder

[11] 3,752,265
[45] Aug. 14, 1973

[54] WHEEL CHAIR LOCKING ARRANGEMENT

[76] Inventor: Alfred W. Lyder, 3611 Ridge Rd., Lansing, Ill. 60438

[22] Filed: Dec. 20, 1971

[21] Appl. No.: 209,977

[52] U.S. Cl. ................................. 188/2 F, 188/7
[51] Int. Cl. ............................................ B60t 1/14
[58] Field of Search ................ 105/369 A, 369 C; 188/2 F, 5, 6, 7, 38, 43

[56] References Cited
UNITED STATES PATENTS
675,405  6/1901  Paul et al. ........................... 188/7 X
737,624  9/1903  Hedrick ................................ 188/38
2,263,392  11/1941  McNeer et al. ...................... 188/43
3,502,286  3/1970  Warren ............................... 188/7 X

*Primary Examiner*—Duane A. Reger
*Attorney*—Sabin C. Bronson

[57] ABSTRACT

A locking attachment for a wheel chair. The locking arrangement includes vertical shafts lowerable to a position for threading into a socket member fixed to a vehicle floor, thereby to maintain the wheel chair locked against movement.

6 Claims, 7 Drawing Figures

Patented Aug. 14, 1973
3,752,265
2 Sheets-Sheet 1
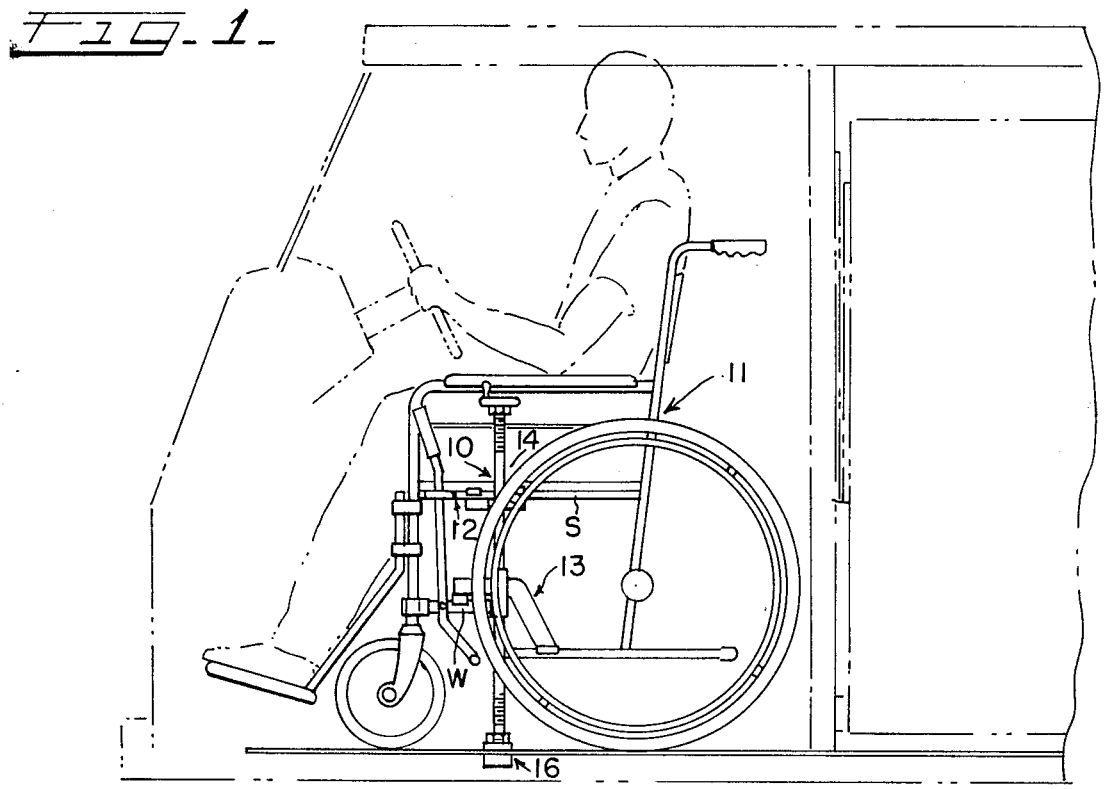
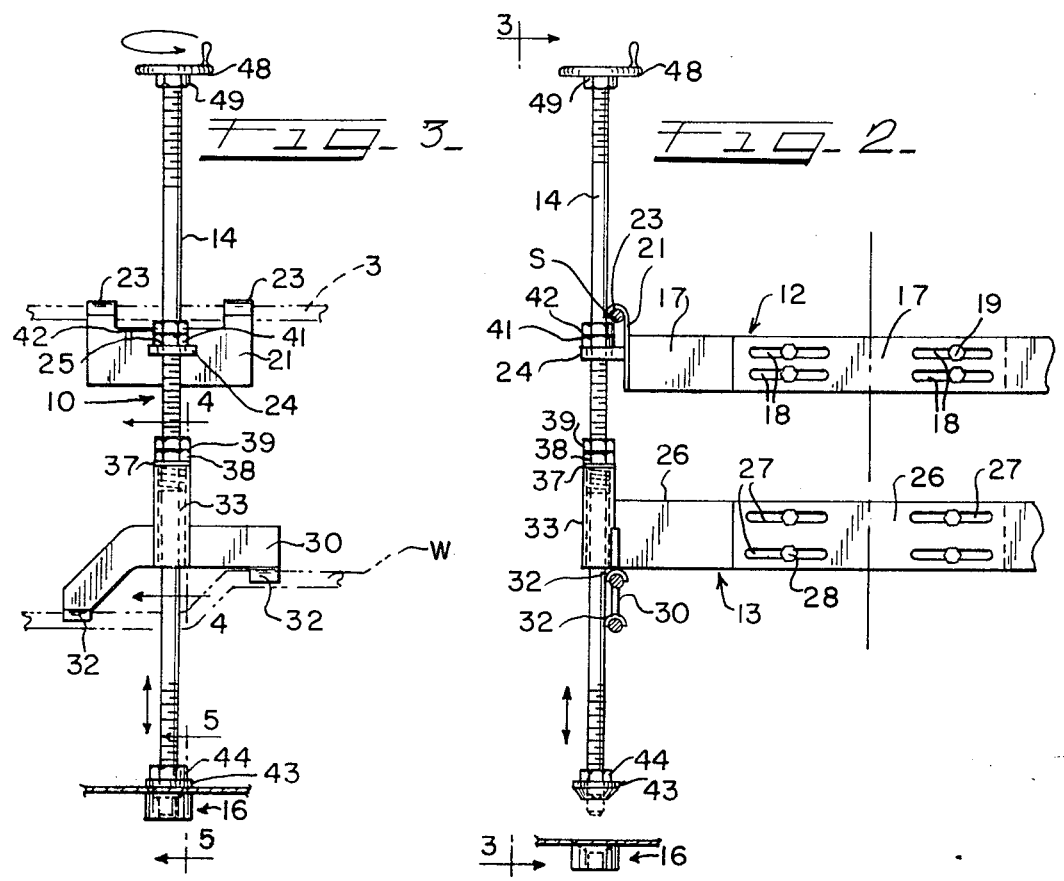

Patented Aug. 14, 1973  3,752,265

WHEEL CHAIR LOCKING ARRANGEMENT

BACKGROUND - SUMMARY - DRAWINGS

The present invention relates to wheel chair accessories and more particularly to an attachment arrangement for positively locking a wheel chair in a stationary location on a floor.

The locking arrangement of the present invention is primarily intended for use in locking a wheel chair in stationary location in motor vehicles, such as panel trucks and the like. Panel trucks are particularly useful for transporting wheel chair ridden paraplegics, or the like because of the ease in modifying the truck structure to accommodate a wheel chair. In fact, these vehicles are particularly adapted to be driven by a paraplegic while seated in a wheel chair removably anchored therein. These panel trucks may also be modified to provide adequately wide doors and entrance platforms so that a paraplegic may self propel the wheel chair into the vehicle. The wheel chair must be maintained stationary within the vehicle in order to withstand sudden starts ad stops. Obviously, the wheel chair must remain stationary if the paraplegic intends to drive the vehicle from the wheel chair.

By the present invention it is proposed to provide an arrangement for restraining or locking a wheel chair against movement within the vehicle without modifying the wheel chair, while only requiring a minimum of modification to the truck.

This is accomplished by an attachment which may be secured to the wheel chair without modification of the latter. This makes it possible to remove the attachment when not needed for use outside of the panel truck if desired. The attachment is constructed so that it may easily be applied to the wheel chair without the use of special tooling.

The attachment includes a pair of vertically movable shafts, adapted to be positioned along the side frames of a wheel chair. The shafts are adjustable from a position above the floor to a position in which the ends are securely seated in opening means fastened to the vehicle floor. The opening means may be in the form of socket members fixed either to the under or upper face of the floor.

Further features of the invention will hereinafter appear.

The drawings which illustrate embodiments of the invention,

FIG. 1 is a side elevational view of a wheel chair occupied by a paraplegic and held stationary in a truck body by the locking arrangement of the present invention.

FIG. 2 is a fragmentary front elevational view of the locking arrangement fastened to the wheel chair frame.

FIG. 3 is a side elevational view of the locking arrangement taken generally along the lines 3—3 of FIG. 2.

Figure 4:
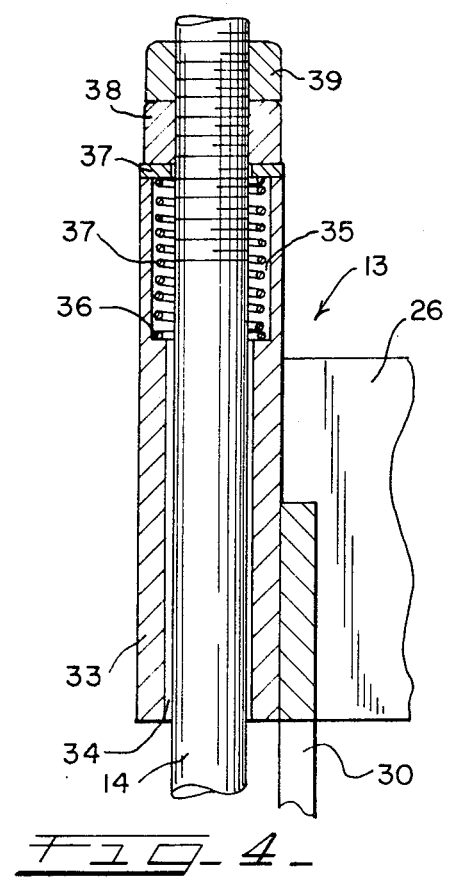
FIG. 4 is an enlarged cross-sectional view of the bracket and sleeve support for the locking shafts taken generally along the lines 4—4 of FIG. 3.
Figure 5:
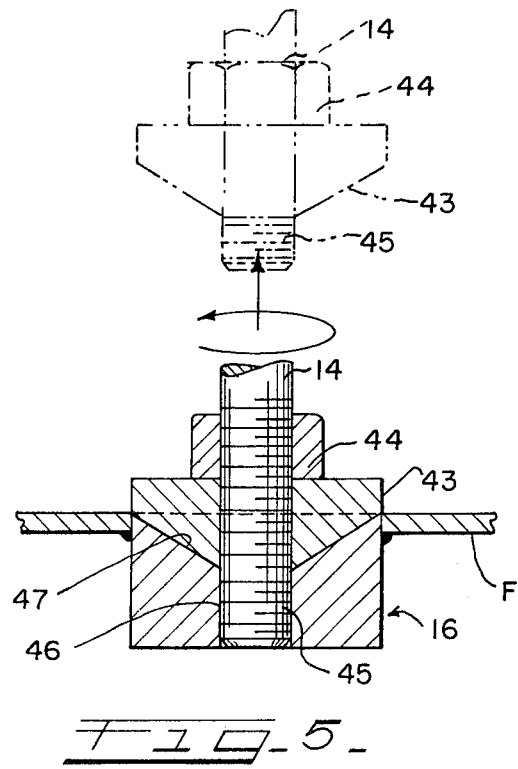
FIG. 5 is a cross-sectional view taken generally along the lines 5—5 of FIG. 3 and showing the locking shaft locked in the socket member.

Referring now to the drawings, the wheel chair locking arrangement 10 of the present invention is shown attached to a wheel chair 11. The wheel chair 11 is located at the driver's side of a panel truck and the chair is occupied by a paraplegic who is illustrated in phantom. The wheel chair 11 must be securely locked in place and held stationary if the paraplegic is to operate the vehicle. The use of the conventional wheel chair hand brake to lock the wheels is not satisfactory because the frictional engagement between the wheels and floor permits relative sliding movement of the chair on the vehicle floor.

The locking arrangement of the present invention comprises an upper or first attachment bracket assembly 12, and a lower or second attachment bracket assembly 13. The upper attachment bracket assembly 12 may conveniently be supported on the braces S forming the seat of the wheel chair and the lower attachment bracket assembly 13 may be supported on the braces W carrying the axis of the wheel chair wheels. The bracket assemblies 12 and 13 support vertically adjustable shafts 14 on the opposite ends thereof. The lower ends of the shafts 14 are seatable in socket members 16 each having a countersunk upper surface. The socket members 16 are suitably fixed to the vehicle floor F.

The upper bracket includes a pair of transversely adjustable plates 17—17 having a plurality of matched elongated openings 18 through which adjustment bolts 19 extend and are fastened by nuts. An attachment plate 21 is connected to each of the opposite ends of the bracket plates 17 and includes hooked ends 23 adapted to engage over the seat supporting brace 3 of the wheel chair 11. Projecting outwardly from and fixed to the outer face of the attachment plate is a horizontal lug 24 having an opening 25 for slidably accommodating the shafts 14.

The second bracket assembly 13 also includes a pair of transversely adjustable plates 26—26 having a plurality of matched openings 27 accommodating bolts 28 which are fastened in place by nuts, not shown, on the end of bolts 28.

Clamping plates 30 are fixed to the outer ends of each of the bracket attachments as by means of welding plates 31 and extend normal thereto. Each of the clamping plates 30 adjacent the ends thereof are provided with downwardly opening substantially U-shaped attachment hooks 32. The hooks 32 are adapted to seat over a wheel supporting brace of the wheel chair 11.

Figure 6:
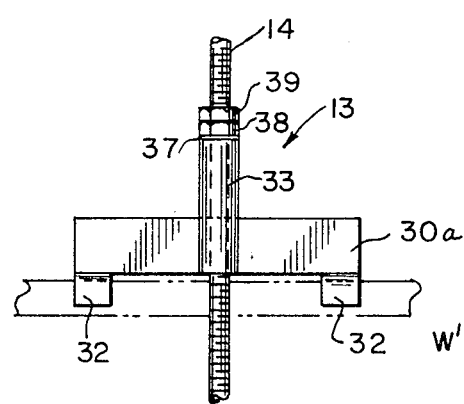
FIG. 6 is a fragmentary front elevational view of another modification of a bracket on which the shaft guiding sleeve is secure with the bracket shown supported on the wheel brace, which is shown in phantom.
Figure 7:
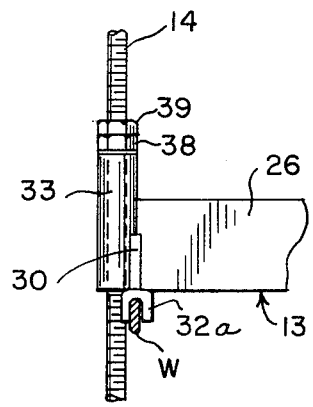
FIG. 7 is an end elevational view of the structure shown in FIG. 6.

The clamping plates 30 may be shaped to accommodate different configurations of the wheel supporting brace W which may be of substantially circular cross-section as shown in FIGS. 1–3 or it may be of substantially rectangular cross-section as shown in FIGS. 6 and 7. It should also be noted that hooks 32a in the embodiment of FIGS. 6 and 7 form a narrower loop so as to be snuggly seated over the narrower rectangular wheel supporting brace W'.

A sleeve 33 is fixed to the outer face of each of the clamping plates 30. The sleeves 33 are formed with an open ended bore 34 which guidingly accommodates the shafts 14. The upper ends of the bores 34 are formed with counter bores 35 providing a shoulder 36. Compression springs 37 are disposed in each of the counter bores 35 with one end in engagement with the shoulder 36 and the other end in engagement with a washer 37 underlying a stop nut 38 threaded on the shaft 14. The spring 37 applies an upward force that serves to yieldingly hold the shaft 14 when released from the socket members 16. The stop nut 38 is held fixed against upward supporting and lengthwise movement by a lock nut 39.

A clamping nut 41 and a lock nut 42 are also threaded on the shafts 14 overlying relationship to the lugs 24. The clamping nuts 41 are in engagement with the lugs 24 when the lower ends of the shafts 14 are seated in the socket members 16.

A frusto-conical plug 43 is threaded to the shafts 14 spaced upwardly from the ends thereof. The plugs 43 are held fixed on the shafts by lock nuts 44. The threaded projecting ends 45 of the shafts 14 are threaded in threaded openings 46 formed in the socket members 16. The upper face of the socket members 16 is formed with a frusto-conical seat 47 complementary to the plug 43. The complementary frusto-conical plug 43 and seat 47 permits easy alignment of the shaft projecting ends 45 and the socket threaded openings 46 and thereby facilitates the insertion therein. An adjustment or hand wheel 48 is held fixed to the upper ends of the shafts 14 by lock nuts 49.

The upper and lower bracket assemblies 12 and 13 are adjusted to the desired width so that the hooked ends 22 and attachment hooks 32 are in engagement with the seat braces S and wheel braces W respectively. When thus positioned, the bolt and nuts on the respective bracket assemblies 12 and 13 maintain the desired width. The shafts 24 are then threaded into the socket opening 46 until the frusto-conical plug 43 is firmly seated in the socket members 16.

The stop nuts 38 are screwed downwardly until the compression springs 37 are wholly within the sleeve counter bores 35. The lock nuts 39 are then threaded into engagement with the stop nuts 38 to prevent rotation of the latter. The clamping nuts 41 and lock nut 42 are threaded so that the former firmly clamps against the faces of the lugs 24.

With the shafts 14 thus threaded in the socket members 16, the wheel chair is held fixed and locked against relative movement to the vehicle floor.

To release the wheel chair, the projecting ends 45 are unthreaded from the openings 46. The compression springs 37 then apply an upward force on the stop nuts 38 so that the shafts 14 are raised upwardly being guided within the openings in the lugs 24. The shafts 14 are raised sufficiently so that projecting ends 45 clear the socket members 16 whereby the wheel chair is free to be wheeled away from its locked position. The locking arrangement remains attached to the wheel chair and may be used whenever necessary by merely depressing the shafts 14 downwardly so that the threaded projecting ends 45 are in alignment with the threaded openings 46 whereupon the shafts 14 are turned to thread the ends 45 in the openings 46.

Having thus described my invention with the requisite particularity, it is believed one versed in the art can readily understand and make the same if desired, having reference to the above description and the accompanying drawings.

I claim:

1. A locking attachment for maintaining a wheel chair locked in stationary position on a floor, said wheel chair having a brace to support the wheel chair seat, and horizontal supports for the wheels of said chair, said attachment comprising a shaft having a threaded end, means for vertically and reciprocably mounting said shaft on said wheel chair, said mounting means including means for guiding said shaft, and socket means in the floor to receive the threaded end of said shaft, to prevent rolling movement of the wheel chair.

2. The invention as defined in claim 1 wherein a frusto-conical member is fixed adjacent to said shaft end and said shaft is threadable in said socket means, and wherein said socket means includes a frusto-conical recess complementary to said member.

3. The invention as defined in claim 1 wherein said shafts include hand wheel means fixed to the upper ends thereof.

4. The invention as defined in claim 1 wherein said mounting means includes a first bracket means adapted to be supported on the brace of the seat support of said wheel chair, and a second bracket means adapted to be supported on said horizontal wheel supports of said wheel chair, and said first and second bracket means includes means for guiding said shafts.

5. The invention as defined in claim 4 wherein said guiding means on said second bracket means comprises a sleeve, and said shaft includes stop means fixed thereto above said sleeve, and wherein spring means are disposed between said stop means and said sleeve, to yieldingly elevate said shaft when unseated from said socket means.

6. The invention as defined in claim 4 wherein said shaft includes clamping means engageable with said guiding means on said first bracket assembly for applying a clamping force so that said bracket means are maintained clamped on said seat supporting brace and said wheel brace, when said shafts are threaded into said socket means.

* * * * *